US010752981B2

(12) United States Patent
Miura

(10) Patent No.: US 10,752,981 B2
(45) Date of Patent: Aug. 25, 2020

(54) MAGNESIUM-LITHIUM ALLOY, METHOD OF MANUFACTURING MAGNESIUM-LITHIUM ALLOY, AIRCRAFT PART, AND METHOD OF MANUFACTURING AIRCRAFT PART

(71) Applicant: FUJI JUKOGYO KABUSHIKI KAISHA, Tokyo (JP)

(72) Inventor: Ayako Miura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1207 days.

(21) Appl. No.: 15/062,507

(22) Filed: Mar. 7, 2016

(65) Prior Publication Data
US 2016/0281200 A1    Sep. 29, 2016

(30) Foreign Application Priority Data

Mar. 23, 2015    (JP) ................. 2015-060102

(51) Int. Cl.
C22F 1/06    (2006.01)
C22C 23/00    (2006.01)
B62D 29/00    (2006.01)

(52) U.S. Cl.
CPC ............. *C22F 1/06* (2013.01); *C22C 23/00* (2013.01); *B62D 29/008* (2013.01)

(58) Field of Classification Search
CPC ........................................................ C22F 1/06
See application file for complete search history.

(56) References Cited

U.S. PATENT DOCUMENTS

| 2012/0222784 A1* | 9/2012 | Kin ................ C22C 23/00 148/557 |
| 2015/0083285 A1* | 3/2015 | Somekawa ........ C22C 23/06 148/667 |
| 2018/0010218 A1 | 1/2018 | Miura et al. | |

FOREIGN PATENT DOCUMENTS

| CN | 1311066 A | 9/2001 |
| CN | 102676894 A | 9/2012 |
| CN | 103643096 A | 3/2014 |
| CN | 104233024 A | 12/2014 |
| JP | 06-279906 | 10/1994 |
| JP | H09-041066 | 2/1997 |
| JP | 2001-300643 A | 10/2001 |
| JP | 3278232 B2 | 4/2002 |
| JP | 2012-057227 | 3/2012 |
| JP | 2013-007068 | 1/2013 |
| JP | 2015-040340 A | 3/2015 |
| WO | 2009/113601 A1 | 9/2009 |
| WO | 2013/180122 A1 | 12/2013 |

OTHER PUBLICATIONS

Machine translation of: Adakazu Ohnishi et al: "Work-hardening and annealing characteristic of Mg-Li binary alloys." Keikinzoku—Journal of the Japan Institute of Light Metals., vol. 39, No. 1, Jan. 1, 1989.*
First European Office Action dated Oct. 8, 2018 in Patent Application No. 16 157 205.2 (9 pages).
Kazuo Matsuzawa, Toshio Koshihara, and Yo Kojima, "Age-hardening and mechanical properties of Mg-Li-Al alloys", Journal of Japan Institute of Light Metals, vol. 39 (1989), No. 1, pp. 45-51.
English machine translation of First Japanese Office Action dated Sep. 20, 2016, in Japanese Patent Application No. 2015-60102 (4 pages).
Second Japanese office action dated Feb. 21, 2017, in Patent Application No. 2015-60102 (7 pages with English machine translation).
Kazuo Matsuzawa et al., The effect of additional element on the age-hardening characteristics and properties of Mg-Li alloys, light metals, JP, The Japan Institute of Light Metals, Sep. 1990, vol. 40, No. 9, p. 659-665 (in Japanese with English abstract).
Ramesh Chandiran et al. Semi-solid Forming Processing for Mg-Li-Ai Super-light Alloys. Abstracts of the 130th National Lecture Meeting, Apr. 30, 1997, p. 47 (6 pages in Japanese with Machine translation).
C. S. Ramesh et al. Microstructural Changes of Strain-introduced Light Mg-Li Al Alloys at Semi-solid Temperature. Abstracts of the 91st Autumn Lecture Meeting, Oct. 15, 1996, pp. 331-332 (10 pages in Japanese with Machine translation).
First Japanese Office Action dated Sep. 20, 2016, in Japanese Patent Application No. 2015-60102 (5 pages).
Wang, Jian-Yih. Mechanical properties of room temperature rolled MgLiAlZn alloy. Journal of Alloys and Compounds, NL, Elsevier, Oct. 19, 2009, vol. 485, p. 241-244.
Japanese Standards Association, JIS H 0001(1998). Aluminium, magnesium and their alloys—Temper designation, JIS Handbook (3) Non-Ferrous Metals & Metallurgy, Japan, Japanese Standards Association, Jan. 19, 2007, first edition, pp. 1201-1209 (in Japanese with English Abstract).
Extended European Search Report dated Aug. 18, 2016 in European Patent Application No. 16157205.2 (11 pages).
Ohnishi, Tadakazu et al. Work-hardening and annealing characteristic of Mg-Li binary alloys, Keikinzoku-Journal of Japan Institute of Light Metals, vol. 39, No. 1, Jan. 1, 1989, pp. 15-20.
Leu, Jyh-Shyan et al. Strengthening and Room Temperature Age-Softening of Super-Light Mg-Li Alloys. Journal of Materials Engineering and Performance, vol. 19, No. 9, Jul. 17, 2009, pp. 1235-1239.

(Continued)

*Primary Examiner* — Christopher S Kessler
(74) *Attorney, Agent, or Firm* — Smith, Gambrell & Russell, LLP

(57) ABSTRACT

According to one implementation, a magnesium-lithium alloy in which at least lithium is added to magnesium is manufactured by giving a strain to a magnesium-lithium alloy workpiece, after a solution treatment, and progressing an aging of the magnesium-lithium alloy workpiece without a heat treatment. The strain is given by a cold working. The aging is progressed after giving the strain. Further, according to one implementation, an aircraft part includes the above-mentioned magnesium-lithium alloy as a material. Further, according to one implementation, a method of manufacturing an aircraft part includes processing the above-mentioned magnesium-lithium alloy.

6 Claims, 5 Drawing Sheets

(56) References Cited

OTHER PUBLICATIONS

Chiang, Chih-Te et al. Rolling route for refining grains of super light Mg-Li alloys containing Sc and Be. Transactions of Nonferrous Metals Society of China, Nonferrous Metals Society of China, CN, vol. 20, No. 8, Aug. 1, 2010, pp. 1374-1379.
Lin, Meng-Chang et al. Effect of annealing temperature on the microstructure and mechanical properties of an as-rolled Mg-9wt.% Li-3wt.%Al-1wt.%Zn alloy sheet. Frontiers of Materials Science, Higher Education Press and Springer, Heidelberg, vol. 8, No. 3, Jul. 28, 2014, pp. 271-280.
Chin, Chui-Hung et al. Microstructure and mechanical behavior of LZ91 Mg alloy processed by rolling and heat treatments. Journal of Alloys and Compounds, Elsevier Sequoia, Lausanne, CH, vol. 460, No. 1-2, Jul. 28, 2008, pp. 246-252.
Wu, S. K. et al. Effects of cold rolling and solid solution treatments on mechanical properties of β-phase Mg-14.3Li-0.8Zn alloy. Materials Science and Engineering A: Structural Materials: Properties, Microstructures and Processing, Elsevier BV, NL, vol. 552, Apr. 30, 2012, pp. 76-80.
Wu, Horng-yu et al. Effects of age heat treatment and thermomechanical processing on microstntcture and mechanical behavior of LAZ1010 Mg Alloy. Materials Science and Engineering A: Structural Materials: Properties, Microstructures and Processing, Elsevier BV, NL, vol. 523, No. 1-2, Oct. 15, 2009, pp. 7-12.

\* cited by examiner

MAGNESIUM-LITHIUM ALLOY, METHOD OF MANUFACTURING MAGNESIUM-LITHIUM ALLOY, AIRCRAFT PART, AND METHOD OF MANUFACTURING AIRCRAFT PART

CROSS REFERENCES TO RELATED APPLICATIONS

This application is based upon and claims the benefit of priority from Japanese Patent Application No. 2015-60102, filed on Mar. 23, 2015; the entire contents of which are incorporated herein by reference.

FIELD

Implementations described herein relate generally to a magnesium-lithium alloy, a method of manufacturing a magnesium-lithium alloy, an aircraft part, and a method of manufacturing an aircraft part.

BACKGROUND

Conventionally, a magnesium alloy is known as a non-ferrous alloy used as a material of automobile parts or aircraft parts (for example, refer to International Publication No. WO 2013/180122 and Japanese Patent Application Publication No. 2012-057227). Characteristics of a magnesium alloy include the lightness of specific gravity and the superiority in specific strength, specific rigidity and heat conductivity, as compared with another main alloy, such as an aluminum alloy or an iron alloy.

Furthermore, a magnesium-lithium (Mg—Li) alloy in which lithium is added, as a metal to be added, to a magnesium is known (for example, refer to International Publication No. WO 2009/113601 and Kazuo MATSUZAWA, Toshio KOSHIHARA and Yo KOJIMA, "Age-hardening and mechanical properties of Mg—Li—Al alloys", Journal of The Japan Institute of Light Metals, 1989, Vol. 39, No. 1, p. 45-51). The Mg—Li alloy has the advantages that the density is low and workability is satisfactory as compared with a magnesium alloy. Mg-14 wt % Li-1 wt % Al alloy, called LA141 standardized by the ASTM International which is a standardization organization, is known as a standardized Mg—Li alloy.

Moreover, although the crystal structure of magnesium is the $\alpha$ phase which has the hexagonal-close-packed (hcp) structure, it is known that the crystal structure of magnesium becomes a mixed phase of the $\beta$ phase, whose crystal structure is the body-centered cubic (bcc) structure, with the $\alpha$ phase when lithium is contained 6 wt % to 10.5 wt %. Furthermore, it is also known that the crystal structure of magnesium becomes the $\beta$-single-phase when lithium is contained not less than 10.5 wt %. That is, the crystal structure of an Mg—Li alloy is changeable by the content of lithium being changed.

According to International Publication No. WO 2009/113601, it is reported that the $\beta$ single-phase is obtained when a composition of an Mg—Li alloy is not less than 10.5 wt % and not more than 16.0 wt %, and preferably not less than 13.0 wt % and not more than 15.0 wt % of lithium, and an alloy which is light and excellent in a cold workability can be made. Also, it is reported that when the aluminum is contained not less than 0.50 wt % and not more than 1.50 wt %, mechanical strength can be improved. Furthermore, it is reported that when an Mg—Li alloy ingot is subjected to a cold plastic working, and subsequently, to an annealing at 170° C. to 250° C., corrosion resistance and cold workability can be improved. Note that, annealing is a heat treatment aimed to remove strain arising due to work hardening and to improve ductility.

Meanwhile, in Kazuo MATSUZAWA et al., an Mg—Li alloy consisting of the $\alpha$-single-phase, an Mg—Li alloy mixed of the $\alpha$ phase and the $\beta$ phase, and an Mg—Li alloy consisting of the $\beta$-single-phase have been made respectively, and the result of examinations of rolling workability, aging hardening property and mechanical property has been reported. Specifically, three kinds of Mg—Li alloy ingots having the a-single-phase, a mixed-phase of the $\alpha$ phase and the $\beta$ phase, and the $\beta$-single-phase were rolled at room temperature with process annealing, and subsequently, solution treatment and aging treatments were performed. As a result, it has been reported that the cold rolling workability of the $\beta$-single-phase of Mg—Li alloy has been improved the most. In the examinations, the solution treatment after rolling has been performed at 390° C., and the aging treatments has been performed at 60° C., 100° C. and 150° C.

Note that, solution treatment is a heat treatment which progresses solid solution of alloy contents by heating an alloy and quenches the alloy to avoid generating precipitates. Meanwhile, aging treatment is a treatment which changes material characteristic of metal by time passage. The aging advancing at a normal temperature is called natural aging while the aging advancing at a higher temperature than a normal temperature is called artificial aging or tempering aging.

On the other hand, in recent years, the composite material attracts attention as a material alternative to a metal material. This is because the composite material is lighter than a standard metal, such as an aluminum alloy and also, the strength of the composite material is higher than that of the standard metal. Consequently, the use rate of composite material tends to increase, in particular in aircraft parts requiring both of weight-saving and keeping strength.

An object of the present invention is to develop a material having better property, as a material for an automobile part, an aircraft part or the like.

SUMMARY OF THE INVENTION

In general, according to one implementation, a magnesium-lithium alloy in which at least lithium is added to magnesium is manufactured by giving a strain to a magnesium-lithium alloy workpiece, after a solution treatment, and progressing an aging of the magnesium-lithium alloy workpiece without a heat treatment. The strain is given by a cold working. The aging is progressed after giving the strain.

Further, according to one implementation, an aircraft part includes the above-mentioned magnesium-lithium alloy as a material.

Further, according to one implementation, a method of manufacturing an aircraft part includes processing the above-mentioned magnesium-lithium alloy.

Further, according to one implementation, a method of manufacturing an aircraft part includes: giving a strain to a magnesium-lithium alloy after a solution treatment, by a cutting work or a shot peening as a cold working; progressing an aging of the magnesium-lithium alloy after giving the strain, without a heat treatment; and manufacturing the aircraft part by processing the magnesium-lithium alloy after a progress of the aging.

Further, according to one implementation, a method of manufacturing a magnesium-lithium alloy includes: performing a solution treatment of a magnesium-lithium alloy workpiece; giving a strain to the magnesium-lithium alloy workpiece after the solution treatment, by a cold working; and progressing an aging of the magnesium-lithium alloy workpiece after giving the strain, without a heat treatment.

DETAILED DESCRIPTION

A magnesium-lithium alloy, a method of manufacturing a magnesium-lithium alloy, an aircraft part, and a method of manufacturing an aircraft part according to implementations of the present invention will be described with reference to the accompanying drawings.

Figure 1:
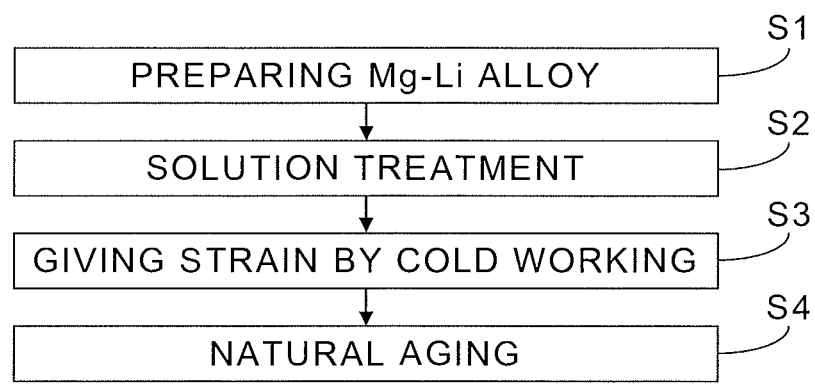
FIG. 1 is a flow chart which shows a method of manufacturing a magnesium-lithium alloy according to an implementation of the present invention.

FIG. 1 is a flow chart which shows a method of manufacturing a magnesium-lithium alloy according to an implementation of the present invention.

In the step of S1, an Mg—Li alloy workpiece which has desired composition is prepared as a material. The Mg—Li alloy which is a manufacturing object is an alloy in which at least lithium is added to magnesium. Moreover, an Mg—Li alloy in which at least one of aluminum, calcium and zinc in addition to lithium is added may be a manufacturing object.

When the content of lithium is less than 6 wt %, the crystal structure of an Mg—Li alloy is the $\alpha$-single-phase, and when the content of lithium is not less than 6 wt % and less than 10.5 wt %, the crystal structure of an Mg—Li alloy is a mixed phase of the $\alpha$ phase and the $\beta$ phase. Furthermore, when the content of lithium is not less than 10.5 wt %, the crystal structure of an Mg—Li alloy is the $\beta$-single-phase. Although slip systems in the $\alpha$ phase are generally limited, the $\beta$ phase has many slip systems. Therefore, a mixed phase of the $\alpha$ phase and the $\beta$ phase is more satisfactory in cold workability than the $\alpha$-single-phase, and the $\beta$-single-phase is more satisfactory in cold workability than a mixed phase of the $\alpha$ phase and the $\beta$ phase.

That is, cold workability is able to be improved by increasing the content of lithium to make the crystal structure of an Mg—Li alloy into the $\beta$-single-phase. Note that, it is known that when the content of lithium exceeds 16.0 wt %, corrosion resistance and strength of the Mg—Li alloy deteriorate. Therefore, it is preferable from the point of view of obtaining a satisfactory cold workability to add lithium so that the content of lithium is not less than 10.5 wt % and not more than 16.0 wt %.

Moreover, the characteristic of an Mg—Li alloy can be improved by adding the third element. For example, when aluminum is added, strength of an Mg—Li alloy, such as tensile strength, hardness and the like, can be improved. Therefore, from the point of view of improvement in strength of an Mg—Li alloy, addition of aluminum is a preferable condition. The deposit of lithium-aluminum can be considered as a factor that addition of aluminum improves the strength of an Mg—Li alloy. Therefore, it is reasonable to consider that an appropriate addition amount of aluminum is not more than 16.0 wt % although it changes depending on an addition amount of lithium.

Meanwhile, workability can be improved by adding zinc in addition to aluminum. For example, it has been confirmed that an Mg—Li alloy, in which aluminum has been added by 3 wt % and zinc has been added by 1 wt %, has been easy to applied to plastic forming. Furthermore, it has been confirmed that the corrosion resistance can be improved when calcium has been added.

From the above viewpoints, materials according to composition of an Mg—Li alloy to be manufactured are prepared respectively. Then, an Mg—Li alloy is manufactured as a material by a known method, such as casting, using the materials corresponding to the composition. When the material of an Mg—Li alloy is manufactured by casting, the material of the Mg—Li alloy can be obtained as an ingot by heating and melting, pouring into a mold, and cooling of raw materials blended according to the intended composition.

Next, in the step of S2, solution treatment of the Mg—Li alloy is performed. The solution treatment of the Mg—Li alloy can be carried out by heating the Mg—Li alloy at about 200° C. to 300° C., and keeping it warm for about 1 hour to 24 hours.

Next, in the step of S3, a strain is given to the Mg—Li alloy, after the solution treatment, by a cold working. The cold working to give a strain includes plastic working by a simple tension with holding the both ends of the material as well as plastic working, such as rolling, forging, extrusion, drawing, or the like. Note that, air cooling may be performed before the cold working.

Next, in the step of S4, aging of the Mg—Li alloy after giving the strain is progressed without heat treatment. As for an Mg—Li alloy, aging is progressed even at a normal temperature. Therefore, natural aging of the Mg—Li alloy can be progressed at a normal temperature.

That is, the above mentioned Mg—Li alloy is manufactured by giving a strain by a cold working after solution treatment, and advancing aging without heat treatment after giving the strain.

Next, the mechanical characteristic of the Mg—Li alloy manufactured by the process as mentioned above will be explained.

Figure 2:
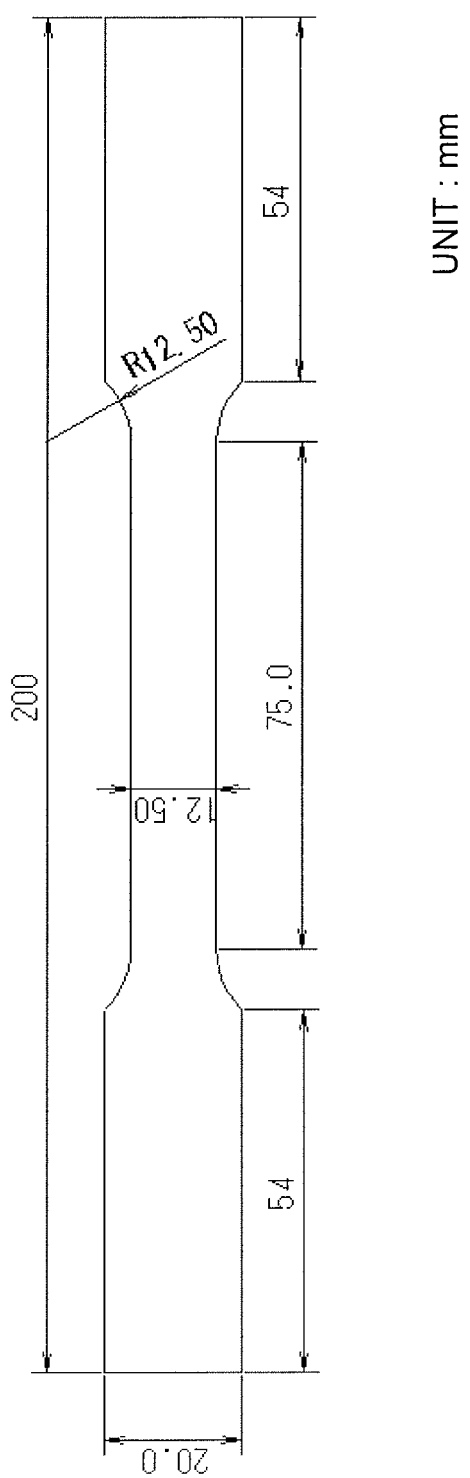
FIG. 2 is a view showing the shape of test piece used in order to examine the characteristic of the Mg—Li alloy manufactured by the method shown in FIG. 1.

FIG. 2 is a view showing the shape of test piece used in order to examine the characteristic of the Mg—Li alloy manufactured by the method shown in FIG. 1.

The mechanical characteristic of the Mg—Li alloy has been examined using a tabular test piece which has a form as shown in FIG. 2. Note that, the test piece shown in FIG. 2 corresponds to ASTM E8 standardized by the ASTM International which is a standardization organization. The composition of the test piece which has been used for the examination is Mg-14 wt % Li-9 wt % Al.

Figure 3:
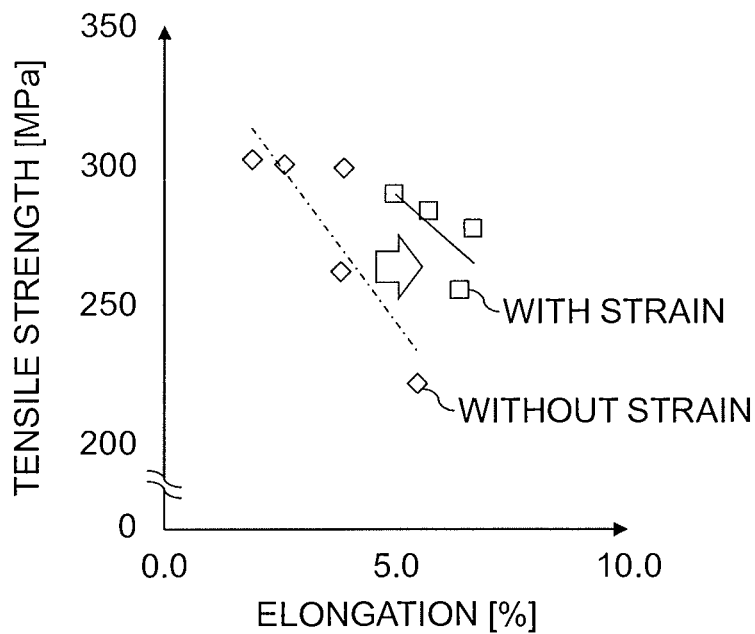
FIG. 3 is a graph which shows a relation between tensile strength and elongation of the Mg—Li alloy manufactured by the method shown in FIG. 1.

FIG. 3 is a graph which shows a relation between tensile strength and elongation of the Mg—Li alloy manufactured by the method shown in FIG. 1.

In FIG. 3, the vertical axis shows tensile strengths (MPa) of the Mg—Li alloy obtained by tensile testing, and the horizontal axis shows elongations (%) of the Mg—Li alloy corresponding to the tensile strengths. Moreover, in FIG. 3, the rhombic marks are data which shows a relation between the tensile strengths and the elongations of the conventional Mg—Li alloy to which a strain has not been given by a cold working, and the square marks are data which shows a relation between the tensile strengths and the elongations of the Mg—Li alloy to which a strain has been given by a cold working, that is, manufactured by the method shown in FIG. 1.

As the rhombic marks show, the relation between the tensile strengths and the elongations of the conventional Mg—Li alloy to which a strain has not been given by a cold working is generally linear. Specifically, the larger the tensile strength becomes, the smaller the elongation becomes. On the other hand, the relation between the tensile strengths and the elongations of the Mg—Li alloy, which has been obtained by giving a strain at the speed of 100 mm/minute by a tension after solution treatment so that a strain amount becomes 1%, resulted in the square marks. Note that, the elongation and strain amount are a value which has been derived by dividing a length, extended by tension, by an initial length.

According to FIG. 3, it turns out that giving a strain to an Mg—Li alloy by a cold working improves the elongation significantly. Specifically, it has been confirmed that the ductility of an Mg—Li alloy can be improved by a cold working. As a reason of the improvement in elongation by a cold working, a mechanism is assumed that the effect of aging is promoted since generation sites of aging deposit are formed by a cold working after solution treatment.

The assumption differs from the conventional opinion that a workability of Mg—Li alloy can be improved when strains arising due to work hardening after plastic working are removed by annealing. Moreover, the above mentioned method also differs from the conventional method of manufacturing an Mg—Li alloy which performs solution treatment after a cold working.

Figure 4:
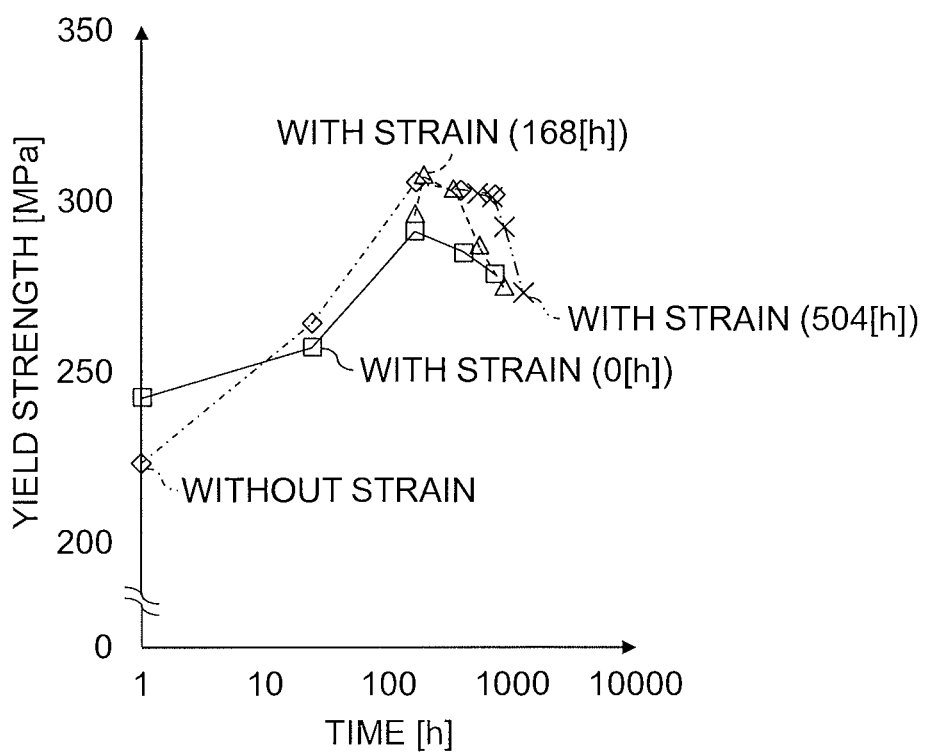
FIG. 4 is a graph which shows a relation between aging progression time and strength of the Mg—Li alloy manufactured by the method shown in FIG. 1.

FIG. 4 is a graph which shows a relation between aging progression time and strength of the Mg—Li alloy manufactured by the method shown in FIG. 1.

In FIG. 4, the horizontal axis shows the time (h) from after the solution treatment to tensile testing of Mg—Li alloy by a tensile testing machine, which is aging progress time, and the vertical axis shows yield strengths (MPa) of Mg—Li alloys. Specifically, FIG. 4 shows aging curves of Mg—Li alloys.

Moreover, in FIG. 4, the polygonal line connecting the rhombic marks shows an aging curve of the conventional Mg—Li alloy to which a strain has not been given by a cold working. On the other hand, polygonal lines connecting the square marks, the triangular marks, and the crossing marks show aging curves of Mg—Li alloys to which strains have been given with setting the periods from the solution treatment to the cold working as 0 hours, 168 hours, and 504 hours respectively.

According to FIG. 4, it can be confirmed that the yield strength of the Mg—Li alloy has been improved immediately after giving a strain to the Mg—Li alloy. After that, the yield strength of the Mg—Li alloy to which a strain has been given decreases by the natural aging more than the yield strength of the Mg—Li alloy to which a strain has not been given. However, it turns out that the yield strengths of the Mg—Li alloys are equivalent to each other after the aging advances enough, regardless of whether a strain has been given or not, and the period from the solution treatment to the cold working. That is, according to FIG. 4, it can be confirmed that an Mg—Li alloy has a stable equivalent strength when the aging period after the cold working of the Mg—Li alloy is determined so that the elapsed time after the solution treatment is not less than 1000 hours.

Therefore, when the results shown in FIG. 3 are also referred to, it is confirmed that when a strain is given to an Mg—Li alloy by a cold working, an elongation can be improved with keeping a strength. That is, it turns out that the ductility of an Mg—Li alloy with work hardening is improved better than that of an Mg—Li alloy having the same strength without work hardening.

Figure 5:
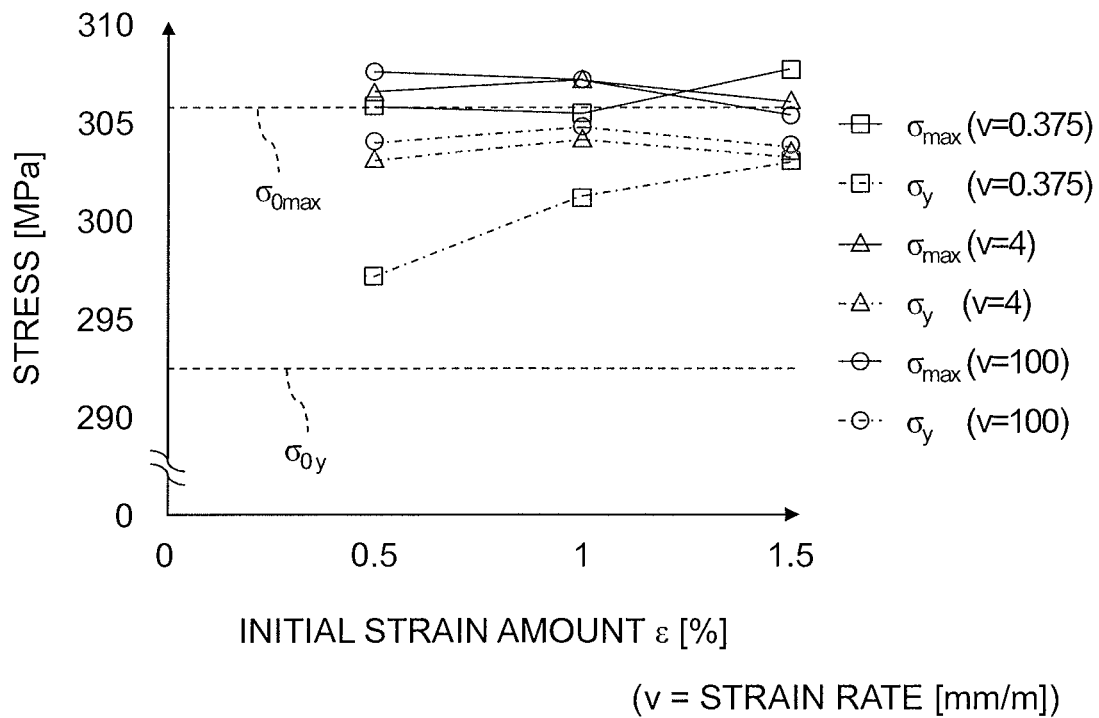
FIG. 5 is a graph which shows a relation between given strain amount and each of the yield stress and the maximum stress of the Mg—Li alloy manufactured by the method shown in FIG. 1.

FIG. 5 is a graph which shows a relation between given strain amount and each of the yield stress and the maximum stress of the Mg—Li alloy manufactured by the method shown in FIG. 1. Meanwhile, FIG. 6 is a graph which shows a relation between given strain amount and elongation of the Mg—Li alloy manufactured by the method shown in FIG. 1.

In FIG. 5, the horizontal axis shows the initial strain amounts ε (%) which have been given to Mg—Li alloys, and the vertical axis shows the yield stresses $\sigma_y$ (MPa) and the maximum stresses $\sigma_{max}$ (MPa). On the other hand, in FIG. 6, the horizontal axis shows the initial strain amounts ε (%) which have been given to the Mg—Li alloys, and the vertical axis shows the elongations δ (%). Note that, in FIG. 5 and FIG. 6, the dotted lines show the maximum stress $\sigma_{0max}$, the yield stress $\sigma_{0y}$ and the elongation $\delta_0$ of the conventional Mg—Li alloy to which a strain has not been given by a cold working.

Figure 6:
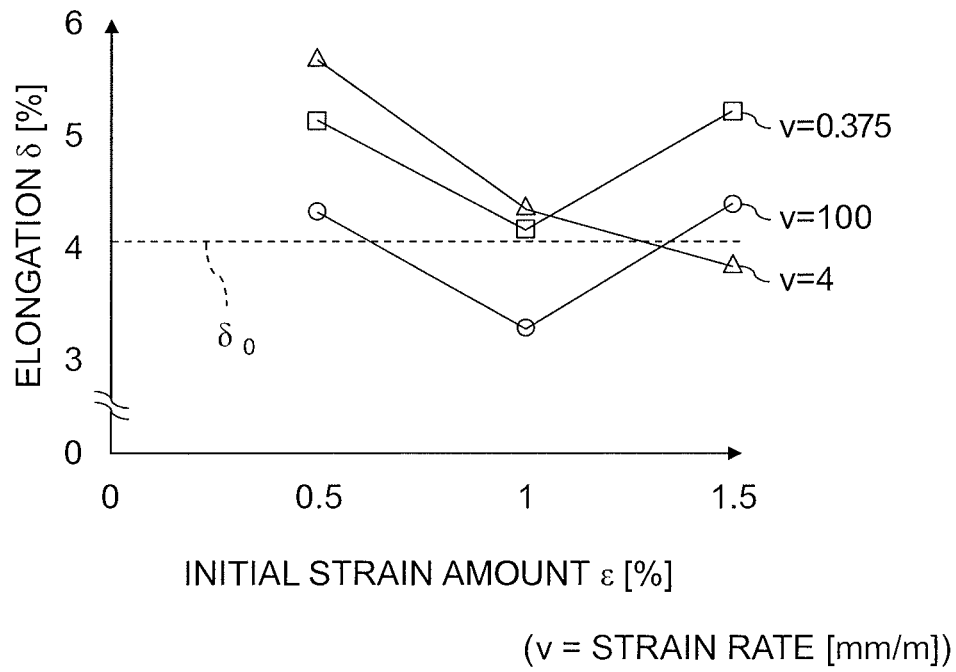
FIG. 6 is a graph which shows a relation between given strain amount and elongation of the Mg—Li alloy manufactured by the method shown in FIG. 1.

The results shown in FIG. 5 and FIG. 6 have been obtained as the result of the yield stress σy, the maximum stress σmax and the elongation δ of Mg—Li alloy measured within 24 hours after the strain has been given with changing the strain rate v and the initial strain amount E. The strain rate v had been set to three kinds including 0.375 (mm/minute), 4 (mm/minute), and 100 (mm/minute), while the initial strain amount ε had been set to three kinds including 0.5%, 1.0% and 1.5%.

When FIG. 5 and FIG. 6 are referred to, the improvement in strength and the increase in elongation δ after the strain has been given can be confirmed in any of the cases that the initial strain amount ε is 0.5%, 1.0% and 1.5%. Therefore, it is turned out that the improvement in elongation can be obtained when a strain is given to an Mg—Li alloy so that at least a strain amount becomes not less than 0.5% and not more than 1.5%. In particular, it is turned out that there is a tendency that the larger the initial strain amount ε is, the more the yield stress σ increases immediately after the strain is given.

Moreover, it can be confirmed that the faster the strain rate v is, the more the yield stress $\sigma_y$ and the maximum stress $\sigma_{max}$ increase immediately after the strain is given while the more the elongation δ sometimes decreases. Therefore, it is confirmed that when a strain is given to an Mg—Li alloy at a rate of not less than 100 mm/minute, the strength of the Mg—Li alloy can be improved immediately after the strain is given.

As mentioned above, characteristic of an Mg—Li alloy manufactured by the method shown in FIG. 1 is not improved by a change of composition under the conventional method, but is improved by performing work hardening, heat treatment and aging in an appropriate order. Specifically, the elongation of an Mg—Li alloy can be improved significantly by giving a strain by cold working after solution treatment and by progressing aging, without heat treatment, after giving the strain.

Consequently, an Mg—Li alloy can be used as a metal material alternative to a composite material which attracts attention as a material for aircraft parts especially. In particular, an Mg—Li alloy has a small specific gravity though its strength is inferior to that of a composite material. Moreover, a working of an Mg—Li alloy is easy as compared with a composite material. Therefore, when an aircraft part which contains the Mg—Li alloy, manufactured by the method shown in FIG. 1, as the material is manufactured, it can be expected to secure the characteristic required for the aircraft part and reduce a manufacturing cost, as compared with a case using a composite material.

An Mg—Li alloy can be manufactured as a sheet material. Therefore, to use an Mg—Li alloy, manufactured by the process shown in FIG. 1, as a material for a panel which is one of aircraft parts is an example of usage of the Mg—Li alloy with high practicality. As a matter of course, an Mg—Li alloy is also expected as a material in the next generation for various structural objects, such as a body of car.

When an aircraft part is manufactured by processing an Mg—Li alloy which has been manufactured by the method shown in FIG. 1, it is possible to use, as a material, the Mg—Li alloy to which a strain has previously been given by a cold working, such as tension. Alternatively, a strain may be given afterward by a cold working. That is, it is also possible to manufacture an aircraft part while giving a strain to an Mg—Li alloy after solution treatment which is used as a material.

Figure 7:
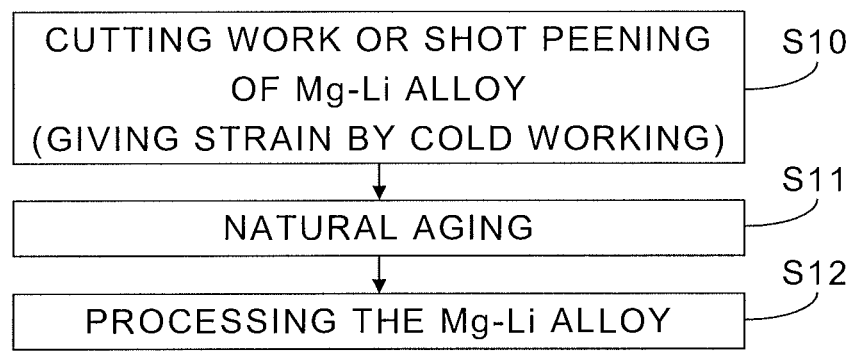
FIG. 7 is a flow chart which shows a flow of a method of manufacturing an aircraft part using an Mg—Li alloy after a solution treatment as a material.

FIG. 7 is a flow chart which shows a flow of a method of manufacturing an aircraft part using an Mg—Li alloy after a solution treatment as a material.

Examples of a method of giving a strain to an Mg—Li alloy in a process of manufacturing an aircraft part include a method of giving a compressive strain to the Mg—Li alloy by cutting work or shot peening. In that case, in the step of S10, a strain is given to the Mg—Li alloy, after solution treatment, by cutting work or shot peening as a cold working. Next, in the step of S11, an aging of the Mg—Li alloy after giving the strain is progressed without heat treatment. After that, in the step of S12, an aircraft part can be manufactured by processing the Mg—Li alloy after the progress of aging.

Note that, when a strain is given to an Mg—Li alloy by cutting work or shot peening, a relation between cutting conditions, such as an amount of cutting, or shot peeing conditions, and strain amounts of Mg—Li alloy can be previously obtained by cutting tests or shot peeing tests. Then, cutting conditions or shot peening conditions corresponding to an appropriate strain amount of an Mg—Li alloy can be easily determined by making a database of relationship between appropriate amounts of Mg—Li alloy, and cutting conditions or shot peening conditions.

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A method of manufacturing an aircraft part comprising:
   giving a strain to a magnesium-lithium alloy, having a lithium content that is not less than 6 weight percent and not more than 16.0 weight percent, after a solution treatment, by a cutting work or a shot peening as a cold working, and wherein the given strain to the alloy is not less than 0.5 percent and not more than 1.5 percent;
   progressing an aging of the magnesium-lithium alloy after giving the strain, without a heat treatment; and
   manufacturing the aircraft part by processing the magnesium-lithium alloy after a progress of the aging.

2. The method according to claim 1, wherein a content of the lithium is not less than 10.5 weight percent and not more than 16.0 weight percent.

3. A method of manufacturing a magnesium-lithium alloy, having a lithium content that is not less than 6 weight percent and not more than 16.0 weight percent; comprising:
   performing a solution treatment of a magnesium-lithium alloy workpiece;
   giving a strain to the magnesium-lithium alloy workpiece after the solution treatment, by a cold working, wherein the given strain to the alloy is not less than 0.5 percent and not more than 1.5 percent; and
   progressing an aging of the magnesium-lithium alloy workpiece after giving the strain, without a heat treatment for a predetermined period of at least 168 hours.

4. The method of manufacturing the magnesium-lithium alloy according to claim 3, wherein the predetermined period of the aging is determined to make an elapsed time after the solution treatment be not less than 1000 hours.

5. The method of manufacturing the magnesium-lithium alloy according to claim 3, wherein the strain is given to make an amount of the strain be not less than 1.0 percent and not more than 1.5 percent.

6. The method according to claim 3, wherein a content of the lithium is not less than 10.5 weight percent and not more than 16.0 weight percent.

* * * * *